(12) United States Patent
Reynolds et al.

(10) Patent No.: US 8,033,600 B2
(45) Date of Patent: Oct. 11, 2011

(54) SEAT SYSTEM WITH SHOCK- AND VIBRATION-REDUCING BLADDERS

(75) Inventors: Douglas D. Reynolds, Las Vegas, NV (US); Erik Wolf, Las Vegas, NV (US)

(73) Assignee: ErgoAir, Inc., Las Vegas, NV (US)

( * ) Notice: Subject to any disclaimer, the term of this patent is extended or adjusted under 35 U.S.C. 154(b) by 415 days.

(21) Appl. No.: 12/129,529

(22) Filed: May 29, 2008

(65) Prior Publication Data

US 2008/0296946 A1      Dec. 4, 2008

Related U.S. Application Data

(60) Provisional application No. 60/940,462, filed on May 29, 2007.

(51) Int. Cl.
*B60N 2/42* (2006.01)

(52) U.S. Cl. ........... 297/216.1; 297/216.13; 297/216.15; 297/284.3; 297/452.41

(58) Field of Classification Search ............... 297/216.1, 297/216.13, 216.14, 216.15, 284.3, 284.6, 297/452.41, 452.42, 452.47, DIG. 9
See application file for complete search history.

(56) References Cited

U.S. PATENT DOCUMENTS

| | | | |
|---|---|---|---|
| 2,612,645 A | 10/1952 | Boland | |
| 2,684,672 A * | 7/1954 | Summerville | 601/148 |
| 3,112,956 A | 12/1963 | Schick et al. | |
| 3,276,047 A | 10/1966 | Emery | |
| 3,296,635 A | 1/1967 | O'Hanlan | |
| 3,297,023 A | 1/1967 | Foley | |
| 3,303,518 A | 2/1967 | Ingram | |
| 3,446,203 A | 5/1969 | Murray | |
| 3,600,727 A | 8/1971 | Williams | |
| 3,652,126 A * | 3/1972 | Folling | 297/284.6 |
| 3,954,245 A * | 5/1976 | Costin | 248/550 |
| 3,966,146 A | 6/1976 | Roberts | |
| 3,982,786 A * | 9/1976 | Burgin et al. | 297/284.3 |
| 3,984,886 A | 10/1976 | Keeton | |
| 4,175,297 A | 11/1979 | Robbins et al. | |
| 4,444,430 A | 4/1984 | Yoshida et al. | |
| 4,491,364 A | 1/1985 | Hattori et al. | |
| 4,497,517 A | 2/1985 | Gmeiner et al. | |
| 4,514,010 A | 4/1985 | Sabater Gonzalez | |
| 4,516,568 A | 5/1985 | Baxter et al. | |
| 4,518,200 A | 5/1985 | Armstrong | |
| 4,624,877 A | 11/1986 | Lea et al. | |
| 4,629,248 A | 12/1986 | Mawbey | |
| 4,634,179 A | 1/1987 | Hashimoto et al. | |
| 4,690,456 A | 9/1987 | Chiba et al. | |
| 4,707,027 A | 11/1987 | Horvath et al. | |
| 4,775,185 A | 10/1988 | Scholin et al. | |

(Continued)

*Primary Examiner* — Peter R. Brown
(74) *Attorney, Agent, or Firm* — Shewchuk IP Services, LLC; Jeffrey D. Shewchuk (57) ABSTRACT

A seat system has separate air bladders in the seat bottom and seat back. The seat bottom bladder is in fluid communication with the seat back bladder through a plurality of rigid interconnecting tubes, and valves in the tubes or orifice size can control flow rate of air exchange between the seat bottom bladder and the seat back bladder. A panel of resilient, compressible open cell foam extends in each of the seat bottom bladder and the seat back bladder. Through-holes in the foam panel permit accelerated air evacuation to the other bladder when the seat withstands a significant shock event. The vibration and shock attenuation characteristics of the seat are jointly provided by the panel spring force and the bladder air pressure.

21 Claims, 8 Drawing Sheets

U.S. PATENT DOCUMENTS

| | | |
|---|---|---|
| 4,789,202 A | 12/1988 | Alter |
| 4,796,948 A | 1/1989 | Paul et al. |
| 4,807,931 A | 2/1989 | Ishida et al. |
| 4,852,195 A | 8/1989 | Schulman |
| 4,864,671 A | 9/1989 | Evans |
| 4,915,124 A | 4/1990 | Sember, III |
| 4,965,899 A | 10/1990 | Sekido et al. |
| 4,976,104 A * | 12/1990 | Morris et al. ............ 297/DIG. 8 |
| 5,033,133 A | 7/1991 | Nissen |
| 5,052,068 A | 10/1991 | Graebe |
| 5,054,854 A | 10/1991 | Pruit |
| 5,069,837 A | 12/1991 | Sember, III et al. |
| 5,076,643 A | 12/1991 | Colasanti et al. |
| 5,082,326 A | 1/1992 | Sekido et al. |
| 5,090,076 A | 2/1992 | Guldager |
| 5,096,529 A | 3/1992 | Baker |
| 5,117,517 A | 6/1992 | Su |
| 5,121,962 A | 6/1992 | Weber et al. |
| 5,137,329 A | 8/1992 | Neale |
| 5,152,018 A | 10/1992 | Lea |
| 5,189,742 A | 3/1993 | Schild |
| 5,190,348 A | 3/1993 | Colasanti |
| 5,193,237 A | 3/1993 | Holdredge |
| 5,277,474 A | 1/1994 | Hannagan et al. |
| 5,280,997 A | 1/1994 | Andres et al. |
| 5,282,286 A | 2/1994 | MacLeish |
| 5,292,175 A | 3/1994 | Artz |
| 5,303,435 A | 4/1994 | Haar et al. |
| 5,303,977 A | 4/1994 | Sereboff |
| 5,329,656 A | 7/1994 | Leggett |
| 5,330,249 A | 7/1994 | Weber et al. |
| 5,419,612 A | 5/1995 | Rassekhi |
| 5,427,331 A | 6/1995 | Stroud |
| 5,433,506 A | 7/1995 | Jensen |
| 5,450,638 A | 9/1995 | Johnson |
| 5,452,487 A | 9/1995 | Leggett |
| 5,469,592 A | 11/1995 | Johnson |
| 5,473,313 A | 12/1995 | Graebe, Jr. |
| 5,487,197 A | 1/1996 | Iskra, Jr. et al. |
| 5,503,428 A | 4/1996 | Awotwi et al. |
| 5,524,961 A | 6/1996 | Howard |
| 5,529,377 A | 6/1996 | Miller |
| 5,552,205 A | 9/1996 | Lea |
| 5,558,398 A | 9/1996 | Santos |
| 5,562,324 A | 10/1996 | Massara et al. |
| 5,601,332 A | 2/1997 | Schultz et al. |
| 5,630,237 A | 5/1997 | Ku |
| 5,634,685 A | 6/1997 | Herring |
| 5,658,050 A | 8/1997 | Lorbiecki |
| 5,675,855 A | 10/1997 | Culp |
| 5,687,438 A | 11/1997 | Biggie et al. |
| 5,705,252 A | 1/1998 | Lea et al. |
| 5,711,573 A | 1/1998 | Daniels et al. |
| 5,738,406 A | 4/1998 | Deus |
| 5,797,155 A | 8/1998 | Maier et al. |
| 5,826,937 A | 10/1998 | Massara |
| 5,833,312 A * | 11/1998 | Lenz .................. 297/216.13 |
| 5,893,184 A | 4/1999 | Murphy |
| 5,967,608 A | 10/1999 | Van Sickle |
| 5,975,629 A | 11/1999 | Lorbiecki |
| 6,014,784 A | 1/2000 | Taylor et al. |
| 6,219,868 B1 | 4/2001 | Wang |
| 6,260,222 B1 | 7/2001 | Lin |
| 6,305,743 B1 | 10/2001 | Wheeler |
| 6,446,289 B1 | 9/2002 | Su et al. |
| 6,474,733 B1 * | 11/2002 | Heilig et al. ............. 297/216.12 |
| 6,588,038 B1 | 7/2003 | Bondie et al. |
| 6,592,184 B1 | 7/2003 | Segal et al. |
| 6,651,277 B1 | 11/2003 | Marson |
| 6,782,573 B2 | 8/2004 | Odderson |
| 6,826,795 B2 | 12/2004 | Wilkinson |
| 6,886,202 B2 | 5/2005 | Frechette |
| 6,912,748 B2 | 7/2005 | VanSickle |
| 7,059,678 B1 | 6/2006 | Taylor |
| 7,093,898 B2 | 8/2006 | Ladron De Guevara |
| RE39,408 E | 11/2006 | Wang |
| 7,152,920 B2 | 12/2006 | Sugiyama et al. |
| 2002/0014356 A1 | 2/2002 | Cech et al. |
| 2004/0032117 A1 | 2/2004 | Pinto, IV et al. |
| 2004/0237206 A1 * | 12/2004 | Webster et al. .................. 5/727 |

* cited by examiner

SEAT SYSTEM WITH SHOCK- AND VIBRATION-REDUCING BLADDERS

CROSS-REFERENCE TO RELATED APPLICATION(S)

This application claims priority from provisional application No. 60/940,462, filed May 29, 2007, incorporated by reference.

BACKGROUND OF THE INVENTION

The present invention relates to seat technology, and, more particularly, to seat technology used in vehicles which undergo severe vibration and vehicles which may be involved in one or many high impact events wherein the seat is designed in part to minimize injury to the occupant.

Situations exist where vehicle occupants are exposed to excessively high levels of whole body shock and vibration that, at a minimum, can be uncomfortable and, in extreme cases, can result in serious bodily injuries. With regard to vehicles, this can include, but is not limited to:

Vehicles that travel off road over very rough terrains at low and high vehicle speeds;
Material handling vehicles, such as fork lifts, that have to travel over speed or other types of bumps or rough roads or terrains;
Above-ground and underground mining vehicles that travel over rough roads and underground terrains;
Boats that travel at high speeds in very rough seas and other rough waters;
Vehicles that are exposed to explosive devices, such as land minds and improvised explosive devices (IED's), and
Train locomotives during the coupling and uncoupling of train cars.

Bodily injuries can sometimes be experienced as a result of a major single shock or vibration event of extremely high level or as a result of successive exposures over a long period of time to shock and vibration events of moderate or high levels. Vehicle occupants who have sustained previous back injuries from other causes may be much more sensitive and even intolerant to even moderate levels of whole body shock and vibration exposures from the operation of vehicles. The Parliament of the European Union (EU) has enacted its Human Vibration Directive to limit the exposure levels of vehicle operators and occupants in member countries of the EU to whole body shock and vibration.

Much has already been done to protect over-the-road and off-road vehicle operators from exposure to whole body shock and vibration. One of the main advances has been in the design, development and continued improvements of air-ride seat systems. Air-ride seat systems are often used in commercial long-haul tractor-trailer rigs and heavy constructions vehicles, such as, dozers, tractor-scrapers and large off-road dump trucks. The air-ride seat system is designed to attenuate low-to-moderately-high frequency continuous vibration and moderate shock levels to which vehicle operators are exposed. It accomplishes this with a low resonance frequency seat isolation system that is supported by a pneumatic spring and an associated damping element. Some air-ride seat systems may passively respond to shock and vibration inputs, and others may be controlled by an active or semi-active vibration control system. While there are several major advantages to such air-ride seat systems, there are significant disadvantages:

They are expensive.

Vehicle exposures to sudden large shock inputs often result in large vertical displacements of the seat and seat occupant. This can result in the seat occupant experiencing uncomfortable severe jolts when the seat hits its motion limits or in the seat occupant hitting his/her head on the vehicle cab roof.
Many air-ride seat systems require a large amount of clear vertical space within a vehicle cab to work effectively.
Most air-ride seat systems give the seat occupant protection for whole-body shock and vibration exposure only in the vertical direction. They do not afford protection in the horizontal (front-to-back) direction.

There are many situations where air-ride shock and vibration isolation seat systems will not work effectively. These include vehicles that:

Have vehicle operator and occupant compartments with very limited vertical clear space;
Are exposed to single or repetitive high shock inputs;
Are exposed to single excessively high shock inputs, and
Need operator shock and vibration attenuation in both the vertical and horizontal directions.

Material handling vehicles, underground mining vehicles, high-speed off road vehicles, some high-speed boats, military and non-military vehicles that can be exposed to land mines and IED's, and train locomotives all fall into one or more of the above categories.

Air bladder systems have long been used for seat cushions and air mattresses and in wheel chair, bicycle, motor cycle, and vehicle seats. They have also been used in hospital beds and beds used in ordinary homes. With the exception of bicycle and motorcycle seats, air bladder systems have primarily been used in seat cushions, air mattresses, wheel chair seats and vehicle seats to improve comfort. Air bladder seat systems used on bicycles and motor cycles have been designed to attenuate low level vibration and shock directed into the buttock of bicycle and motor cycle riders. However, bicycle and motor cycle air bladder seat systems were primarily designed to improve ride comfort. None of these systems were designed to protect individuals from high-level single or multiple shocks. Improvements can be made in effectively using air bladder designs in seat technology for vehicles which undergo severe vibration and vehicles which may be involved in one or many high impact events.

BRIEF SUMMARY OF THE INVENTION

The present invention is a seat system intended to be used to attenuate vibration and shock for an occupant in a vehicle. The seat has a seat bottom and a seat back, each of which includes a separate bladder. The seat bottom bladder is in fluid communication with the seat back bladder through a plurality of interconnections, with the preferred interconnections being tubes formed of a different material from the bladders. A panel of resilient, compressible open cell material such as open cell foam extends in each of the seat bottom bladder and the seat back bladder. The vibration and shock attenuation characteristics of the seat are jointly provided by the panel spring force and the bladder pressure. During a large shock event pressing the occupant against one of the bladders, a significant relief of compressible fluid flows through the interconnections from that bladder into the other bladder, modifying the attenuation characteristics and simultaneously preventing bladder rupture.

While the above-identified drawing figures set one or more forth preferred embodiments, other embodiments of the present invention are also contemplated, some of which are noted in the discussion. In all cases, this disclosure presents the illustrated embodiments of the present invention by way of representation and not limitation. Numerous other minor modifications and embodiments can be devised by those skilled in the art which fall within the scope and spirit of the principles of this invention.

DETAILED DESCRIPTION

Figure 1:
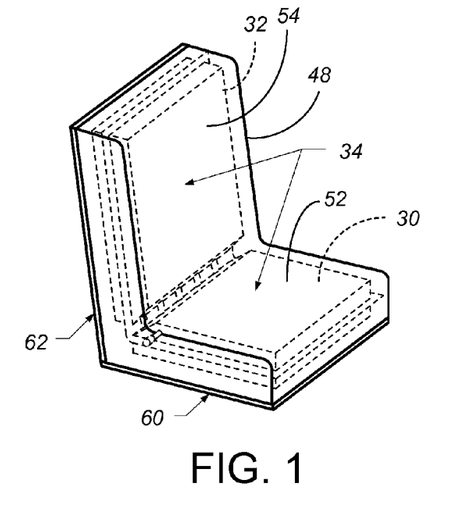
FIG. 1 is a perspective view of a first embodiment of the shock and vibration isolation seat of the present invention.
Figure 2:
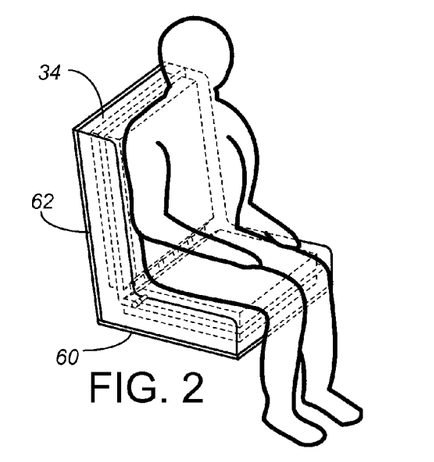
FIG. 2 is a perspective view of the seat of FIG. 1 with the outline of a person sitting on the seat.

A first basic embodiment of the present invention is shown in FIGS. 1 though 9. The present invention involves the use of a seat bottom bladder 30 and a seat back bladder 32 which are jointly used in a vehicle seat 34. The bladders 30,32 contain a compressible fluid, which in the preferred embodiment is air, though other compressible fluids could alternatively be used.

In this embodiment, the bladders 30, 32 are formed around open-cell foam panels 36, 38. The seat panel 36 has interior through-holes 40 placed along its width and through-holes 42 placed along its length. The back panel 38 similarly has interior through-holes 40 placed along its width and through-holes 42 placed along its length. Small tubes 44 form fluid interconnections between the seat bottom bladder 30 and a seat back bladder 32. Valves 46 can be placed in one or more of the tubes 44 to control the fluid flow between the seat bottom and seat back bladders 30, 32. An outer covering 48 is preferably used to protect the bladders 30, 32 and the panels 36, 38.

Each bladder 30, 32 is preferably formed by a top sheet 49 and a bottom sheet 51 of a flexible fluid-impervious covering material. The top sheet 49 is sealed to the bottom sheet 51 around a complete perimeter seal 50 to surround the panels 36, 38. While the top and bottom sheets of the seat bladder 30 could be separate from the top and bottom sheets of the back bladder 32, more preferably a single top sheet 49 and a single bottom sheet 51 are used for both the seat bladder 30 and the back bladder 32, with the sheets 49, 51 joined together over the tubes 44 at an intermediate seal 53. The preferred covering material has an outer layer of textile material that may have elastic or non-elastic properties bonded to an inner fluid-impervious film. The preferred inner film is formed of heat-sensitive low melting temperature polyurethane. With the heat-sensitive polyurethane inner film, the covering material can be sealed around the complete perimeters 50 through a compression and heat process that melts the film on the inside surfaces of covering material. A typical seam width for each sealed perimeter 50 and for intermediate seal 53 is about 0.5 in. Alternatively, the top sheet 49 and bottom sheet 51 can be bonded together around their perimeters 50 by means of RF welding, or by means of a chemical bond or weld. Within the sealed perimeter 50, the top and bottom sheets 49, 51 are bonded to the entire top and bottom surfaces of the open-cell foam panel 36, 38 to avoid the possibility of the top and bottom sheets 49, 51 separating away from the surface of the foam panels 36, 38. Alternatively, the top and bottom sheets 49, 51 can be bonded together at fixed points throughout the surface of the bladder by means of structural elements (not shown) that are placed in the panel 36, 38, or the top and bottom sheets 49, 51 can be joined together solely by the sealed periphery 50.

The density of the foam for the panels 36, 38 can be chosen based upon the desired springiness of the seat 34 and the amount of fluid which is desired to communicate between the two bladders 30, 32 during a vibration or shock event. In the preferred embodiment, the density of the foam panels 36, 38 is within the range of 0.5 to 4.0 lb/ft$^3$ (8.0 to 64.1 kg/m$^3$), and more preferably within the range of 1.0 to 2.0 lb/ft$^3$ (16.0 to 32.0 kg/m$^3$).

For most uses, the dimensions of the panels 36, 38 and bladders 30, 32 are generally sized to appropriately match the dimensions of an adult seat. For instance, the seat bottom 52 can be square or nearly square, such as with length and width dimensions in the range from 16 in.×16 in. to 22 in.×22 in. (40.64 cm×40.64 cm to 55.88 cm×55.88 cm), or more preferably within the range from 17 in.×17 in. to 20 in.×20 in. (43.18 cm×43.18 cm to 50.8 cm×50.8 cm), with most preferred dimensions of 18 in.×18 in. The seat back 54 can be rectangular, such as with length and width dimensions in the range from 16 in.×20 in. to 22 in.×26 in. (40.64 cm×50.8 cm to 55.88 cm×60.04 cm), or more preferably within the range from 17 in.×22 in. to 20 in.×25 in. (43.18 cm×55.88 cm to 50.0 cm×63.5 cm), with most preferred dimensions of 18 in.×24 in (45.72 cm×60.72 cm). The thickness of the foam panels 36, 38, largely defining the uncompressed thickness of the bladders 30,32, is preferably within the range from 2 to 5 in. (5.08 to 12.7 cm), or more preferably within the range from 3 to 4 in. (7.62 to 10.16 cm). If any contour is desired for the seat bottom 52 or seat back 54, the panels 36, 38 can be formed with a contour or contouring machined into the panels 36, 38.

The tubes 44 interconnect the bladders 30, 32 by forming channels through which air or other compressible fluids can flow between the seat bottom bladder 30 and seat back bladder 32. The tubes 44 are preferably sufficiently rigid to prevent compressive closure even under the shock and vibrations to which the seat 34 will be subjected. The preferred tubes 44 are made of rigid urethane or plastic. If not provided with any valving within the tubes 44, the sizes and number of the tubes 44 depends upon the amount of fluid flow desired between the bottom bladder 30 and the back bladder 32 during a compressive event. For instance, the diameters of the preferred tubes 44 are within the range from 0.25 to 0.75 in. (0.635 to 1.905 cm), or more preferably within the range from 0.375 to 0.625 in. (0.9525 to 1.5875 cm), with a most preferred diameter of 0.5 in. (1.27 cm). At this size, an appropriate number of tubes 44 is from two to eight, or more preferably from four to six, with the most preferred number of tubes 44 being the five tubes 44 shown in FIG. 3, nominally spaced about 2.625 in. (6.67 cm) apart. The length of the tubes 44 need only be sufficient to interconnect the bladders 30, 32, such as a nominal length within the range from 0.5 to 1 in. (1.27 to 2.54 cm).

Figures 5, 6, 7, 8, 9:
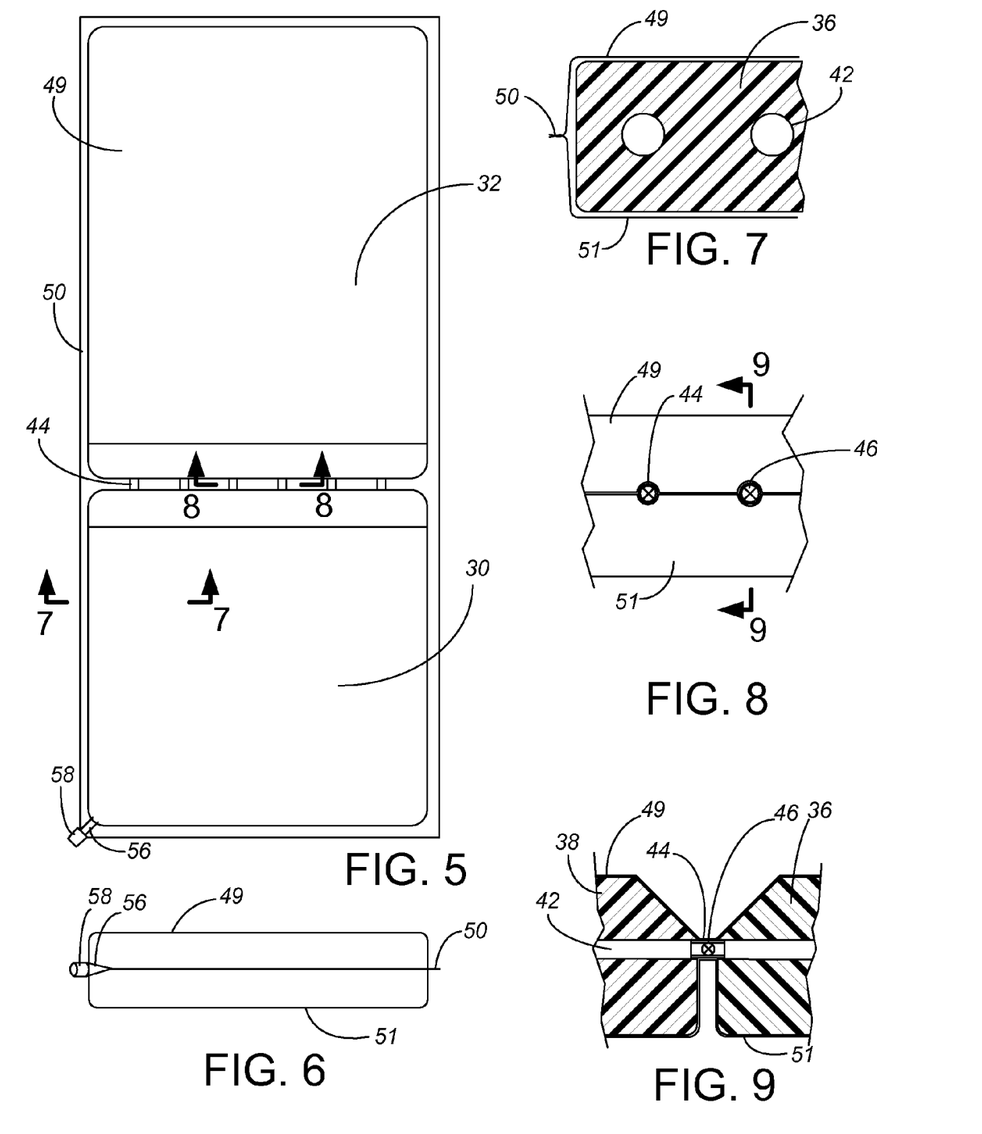
FIG. 5 is a plan view of the seat similar to that of FIG. 3 when unfolded, but with a valve in a different location and with six interconnection tubes rather than five.
FIG. 6 is a side view of the unfolded seat of FIG. 5.
FIG. 7 is an enlarged partial cross-sectional view taken along lines 7-7 in FIG. 6.
FIG. 8 is an enlarged partial cross-sectional view taken along lines 8-8 in FIG. 6, showing the tubes connecting the seat bottom and seat back air cavities.
FIG. 9 is a partial cross-sectional view taken along lines 9-9 in FIG. 8, showing the tubes connecting the seat bottom and seat back air cavities.

If desired, valves 46 (shown schematically in FIGS. 8 and 9) can be placed in one or more of the tubes 44 to control the airflow between the seat bottom and seat back bladders 30, 32. The valves 46 can be:

Small orifices that restrict the airflow between the seat bottom bladder 30 and back bladder 32;

Check valves that allow the airflow between the seat bottom bladder 30 and back bladder 32 to flow in only one direction;

A combination of small orifices and check valves; or

Electronically actuated valves that control the airflow between the seat bottom bladder 30 and back bladder 32 and that are actuated by an electronic control circuit (not shown) that monitors the air pressure and airflow between the seat bottom and back bladders 30, 32.

The through-holes 40, 42 in the panels 36, 38 help to facilitate the movement of air or other compressible fluid within the open-cell foam matrix. The number, sizing and spacing of the through-holes 40, 42 depends on the density and permeability of the open cell foam and the desired flow rate during a compression or vibration event. For instance, by having the through-holes spaced about every 4 in. (10.16 cm), even if through-holes only extend parallel to one another in one direction, the longest distance required for air to evacuate from the foam to a through-hole is only about 2 in. (5.08 cm). Shortening the air evacuation route through the open-cell foam increases the efficacy of the tubes 44 and any valves 46, since the vast majority of impediment to air flow from one bladder to the other is provided by the tubes 44 and any valves 46 rather than by the open cell foam of the panels 36, 38.

The preferred embodiment includes through-holes 40, 42 in both the seat panel 36 and the back panel 38, and further includes both through-holes 40 along the width and through-holes 42 along the length of each foam panel 36, 38. If desired to reduce expense, the widthwise through-holes 40 can be omitted, as the lengthwise through-holes 42 terminating near the tubes 44 are more important for conducting fluid flow during a compression or vibration event. Similarly, if desired to reduce expense or to eliminate any support issues for the exposed covering material on the ends of the through holes 40, 42, the through holes 40, 42 may be replaced by recesses which extend less than all the way through the seat panel 36 and back panel 38 but have ends open to the tubes 44. Presuming the foam panels 36, 38 are formed prior to being sealed in the bladders 30, 32, the through-holes 40, 42 can be simply and easily cut into the foam prior to placement in the covering material. For the dimensions of the preferred seat panel 36, the number of holes 40,42 along the width and length of foam panel 36 is preferably from two to eight, and more preferably from four to six, and most preferably the sets of five through-holes 40, 42 shown in FIG. 4. For the dimensions of the preferred back panel 38, the number of lengthwise holes 42 is preferably from two to eight, and more preferably from four to six, and most preferably five through-holes 42, while number of widthwise through-holes 40 is preferably from two to twelve, and more preferably from five to eight, and most preferably the seven through-holes 40 shown in FIG. 4. The diameters of the through-holes 40, 42 depend upon the density, compression strength and springiness of the open cell foam. In the preferred embodiment, the through-holes 40, 42 have a diameter within the range from 0.5 to 1 in. (1.27 to 2.54 cm).

Figure 3:
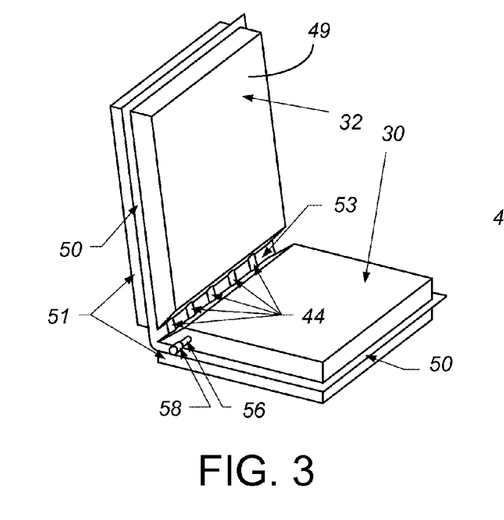
FIG. 3 is a perspective view of the seat of FIGS. 1 and 2 with the protective outer covering removed.
Figure 4:
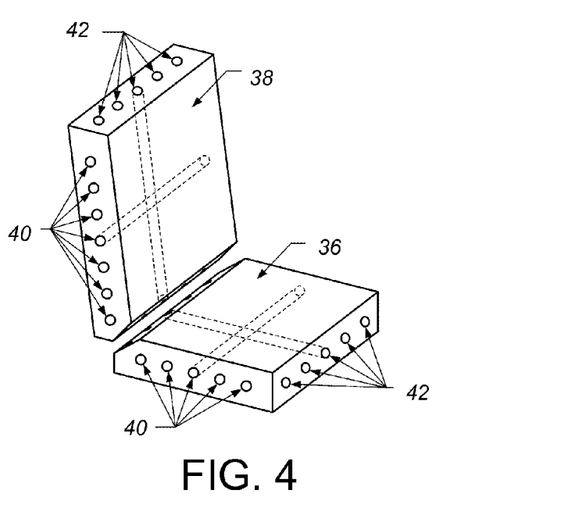
FIG. 4 is a perspective view of the bottom and seat back foam panels within the seat of FIGS. 1-3.

The preferred embodiment further includes a mechanism to permit filling or evacuating the bladders 30, 32 from/to an outside fluid source. For this purpose, a vent tube 56 with a shut-off valve 58 can be placed in the side of the seat bladder 30. For instance, FIG. 3 shows the vent tube 56 and shut-off valve 58 near the rear corner of the seat bottom 52, while FIGS. 5 and 6 show the vent tube 56 and shut-off valve 58 near the front corner of the seat bottom 52. Alternatively, the vent tube 56 and shut-off valve 58 could be placed at any point on the surfaces of the sealed bladders 30, 32. The vent tube 56 and shut-off valve 58 is the point through which air can enter and leave the two sealed cavities formed by the bladders 30, 32. In the basic embodiment of the present invention, air is manually directed into or exhausted from the sealed bladders 30, 32 through the vent tube 56 and shut-off valve 58.

As an alternative to manual inflation through the vent tube 56 and shut-off valve 58, an automatic sensor/controller (not shown) could be used to control the fluid pressure in the seat bladder 30. For this case, the shut-off valve 58 is removed and the vent tube 56 is connected to an air source (not shown), which can be a small air compressor or other device that can supply air to the seat air bladder 30. A pressure sensor or regulator (not shown) is placed in the seat air bladder 30 or in the vent tube 56 between the bladder 30 and air source. For instance, a pressure sensor may sense the pressure in the air bladder and through a control circuit either actuate a relief valve (not shown) to reduce the air pressure or actuate the air compressor or other similar device to increase the air pressure in the seat air bladder 30. The automatic sensor/controller is particularly appropriate if it is desired to regularly adjust the amount of fluid within the bladders 30, 32, such as due to changing altitudes or based upon the severity of a vibration/shock event which is separately sensed. As an alternative to both manual inflation and automatic controlled inflation of the bladders 30, 32, an inexpensive self-inflating configuration can be used. For instance, the shut-off valve 58 may be a simple check valve arrangement that permits air to seep into or out of the bladder at a low pressure difference and low flow rate, but restricts passage of air at any significant pressure difference such as when the seat is occupied and the occupant's weight is pressing down on the seat bladder 30. Such a check valve arrangement would use the spring force of the open cell foam panels 36, 38 to self-inflate the bladders 30, 32 when the seat 34 was unoccupied at any altitude, but then the bladders 30, 32 would be sealed during occupied use of the vehicle.

The outer covering 48 protects the bladders 30, 32 and panels 36, 38 from everyday wear-and-tear and from being punctured by sharp objects. The outer covering 48 that covers the exposed top of the seat bottom 52, front of the seat back 54, and sides of both the seat bottom 52 and back 54 can include an intermediate layer of open or closed cell foam padding or any other natural or synthetic resilient padding and an outer wear-resistant fabric covering. Using an intermediate layer of foam together with an outer wear-resistant fabric helps to form an outer covering 48 which is rugged and robust. If little or no hinging is desired between the seat bottom 52 and seat back 54 (e.g., for seats 34 which cannot "lay back"), a single outer covering 48 may jointly cover both the seat bottom 52 and the seat back 54.

If desired for the vehicle in which the seat 34 will be used, the bottom side of the seat bottom 52 can be covered with a rigid bottom panel 60 and the back side of the seat back 54 can be covered with a rigid seat back 62. The rigid panels 60, 62 help to provide structural support for the seat 34, and can include mounting configurations (not shown) for attaching the seat 34 into the vehicle. The rigid bottom panel 60 could be attached to the vehicle cab floor, or extend from the vehicle side or through structural mounts to the ceiling. Alternatively, the seat 34 can be structurally supported into the vehicle cab through the rigid seat back 62.

Figure 10:
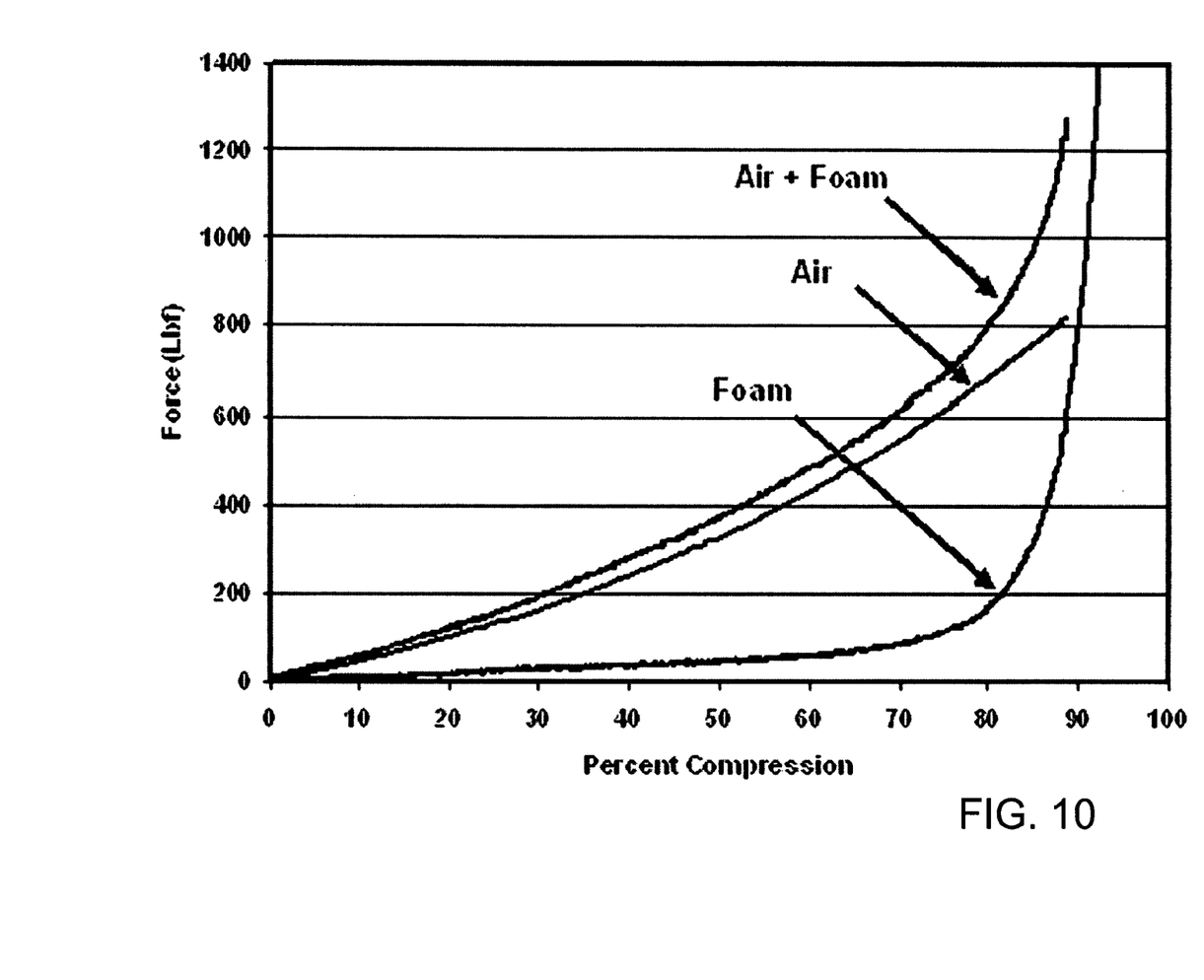
FIG. 10 is a graph showing load-compression curves of the resilient elements that form the shock and vibration isolation seat structure.

The shock- and vibration-reducing functions of the present invention can be characterized by the resilient elements that are contained within the impervious seat bottom bladder 30 and seat back bladder 32. The uncompressed bladder cavities form chambers that allow the seat cushion bottom and back to behave as an air spring. The seat bottom portion of this spring will deflect or compress when loaded by a force associated with the body weight of the seat occupant when the seat base is exposed to a shock or vibration input. A typical compression characteristic associated with the air in the bladders 30, 32 is shown by the curve labeled "Air" in FIG. 10. When open-cell foam panels 36, 38 are placed in the seat bladders 30, 32, a second resilient element in the bladders 30, 32 is the open cell foam panels 36, 38. A typical open cell foam panel compression characteristic is shown by the curve labeled "Foam" in FIG. 10. The total compression characteristic of the seat bottom 52 with the foam panel 36 is the sum of the "Air" and "Foam" characteristics, which is represented by the curve labeled "Air+Foam" in FIG. 10.

When open-cell foam panels 36, 38 are used in the seat bottom bladder 30 and seat back bladder 32, air movement in the seat bottom bladder 30 and in the seat back bladder 32, if the foam panels 36, 38 do not have holes placed along their lengths or widths, is severely restricted and the effective air volume of the seat bottom and back cavities is reduced. Placing lengthwise and widthwise holes 40, 42 in the foam panels 36, 38 increases the effective volume of the seat bottom and back air cavities that are formed by the panels 36, 38 and facilitates unrestricted airflow within the panels 36, 38 and between the seat bottom bladder 30 and back bladder 32. These increase the effectiveness of the air bladder seat system in reducing vibration and shock energy transmitted to the body of the seat occupant.

For the case where a foam panel 36 is placed in the seat bottom 52, when the seat base experiences a low-level shock or vibration input, the shock and vibration attenuation characteristics of the seat bottom and back bladders 30, 32 will be predominantly controlled by the entrapped air in the bladder cavities. The entrapped air will continue to predominantly control the shock and vibration attenuation characteristics of the seat 34 as the intensity of the shock or vibration input is increased until a point is reached where the compression of the foam panel 36 in the seat bottom bladder 30 cavity begins to predominate. At this point, the shock and vibration attenuation characteristics of the seat will be predominantly controlled by the open-cell foam panel 36 in the seat bottom 52. The overall effectiveness of the seat system in reducing shock and vibration energy transmitted to the body of the seat occupant is a function of the combined cavity volumes of the seat bottom and seat back bladders 30, 32, the cavity air pressure, and the material properties of the seat foam panels 36, 38 and the seat foam panel impervious material, fabric or textile covering.

In the case of severe vertical shock directed into a seat 34 with the air bladder seat shock and vibration isolation system of the present invention, the seat bottom air cavity can be nearly or completely collapsed under the dynamic load caused by the body of the seat occupant. This causes air from the seat bottom bladder 30 to be forced into the seat back bladder 32, preventing the seat bottom bladder 30 from rupturing. After the severe shock has abated, the compressed air in the seat back bladder 32 flows back into the seat bottom bladder 30.

The seat air bladder system of the present invention also attenuates front-to-back shock and vibration energy directed into the seat 54. A basic seat air bladder system with a seat bottom bladder 30 and seat back bladder 32 can attenuate shock energy directed into the back that is caused by horizontal shock events, such as a rear-end collision. A seat air bladder system that contains an air bladder head rest (described below) that is fluidly coupled to the seat back air bladder 32 will protect the seat occupant from potentially severe head and neck injuries associated with whiplash caused by severe horizontal shock events.

The seat system represented by the present invention can be used in vehicles with very limited vehicle operator and occupant compartment spaces. It provides acceptable shock and vibration attenuation for moderately high repetitive shock and continuous vibration exposure. Depending on the specified injury criteria, it can also provide acceptable shock isolation for severely high shock exposure. Finally, it can provide shock and vibration protection for both vertical and horizontal shock and vibration exposure. Vehicles in which the present invention can be used include, but are not limited to:

Material handling vehicles,
Underground mining vehicles,
High-speed off road vehicles,
Some high-speed boats,
Military vehicles that can be exposed to land mines and IED's, and
Train locomotives.

The construction of the seat bottom and seat back air bladders 30, 32 in the present invention can take two alternative forms which omit the open cell foam panels 36, 38. If the open cell foam panels 36, 38 are omitted, the bladders 30, 32 can be formed to self retain their desired shape by weld or bond lines that are spaced within the outer peripheral weld line of the bladder to give a desired bladder thickness and contour. Also, structural elements of specified thicknesses can be placed in a specified pattern inside the bladder between the top and bottom film layers and welded or bonded to inside surfaces of these layers to give the bladder a desired thickness and contour.

As another alternative, the functions of both the open cell foam and the bladder can be replaced by proper formation of a cushion using an injection mold process. The shape, contour and thickness of the bladder are machined into A and B sides of an injection mold.

A liquefied impervious elastomeric material is injected into the mold and allowed to set up, typically through cooling solidification. After the material sets up, the A and B sides of the mold are separated, and the bladder is ejected from the mold.

Figure 11:
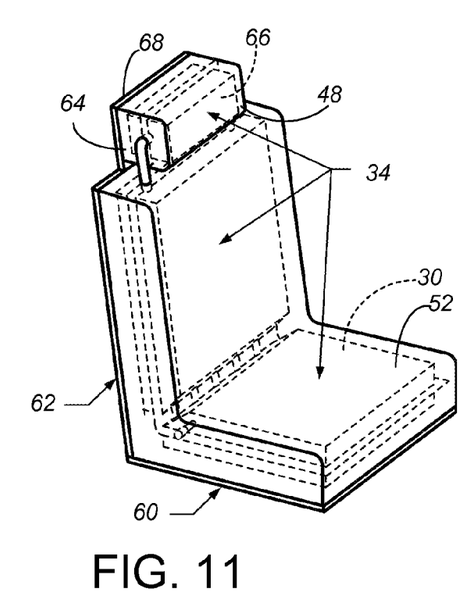
FIG. 11 is a perspective view of a second embodiment of the shock and vibration isolation seat of the present invention.
Figure 12:
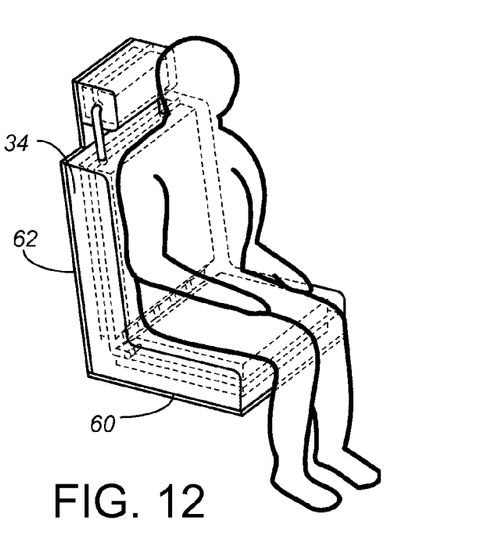
FIG. 12 is a perspective view of the seat of FIG. 11 with the outline of a person sitting on the seat.
Figure 13:
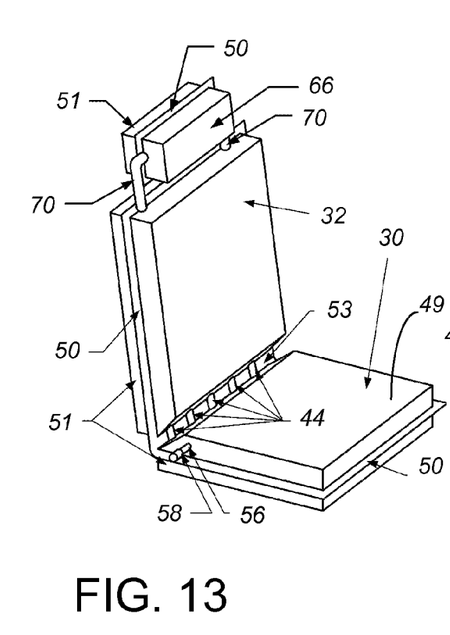
FIG. 13 is a perspective view of the seat of FIGS. 11 and 12 with the protective outer covering removed.
Figure 14:
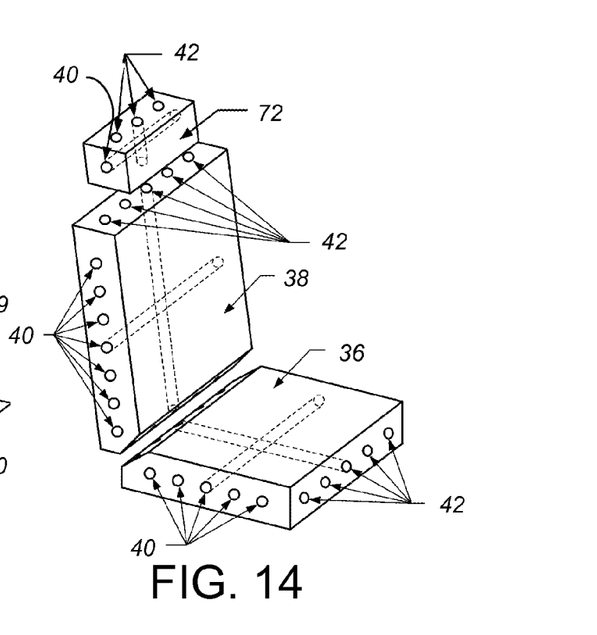
FIG. 14 is a perspective view of the bottom and seat back foam panels within the seat of FIGS. 11-13.

FIGS. 11-14 show an alternative embodiment of the present invention that contains an air bladder head rest 64. FIG. 11 shows the seat air bladder system with an air bladder headrest 64 covered with a robust outer seat covering 48 designed to protect the seat bottom bladder 30, seat back bladder 32 and head rest air bladder 66 from wear and tear. The rigid seat back 62 is extended upward to form a rigid structural backing 68 for the head rest air bladder 66. The rigid backing 68 for the head rest air bladder 66 can be separated from the rigid seat back 62 and then structurally attached to the rigid seat back 62 with a structural support 70 that allows the head rest air bladder to be adjusted up or down with respect to the seat back air bladder 32.

Similar to the seat bottom 52 and seat back 54, the structure of the head rest 64 is created by a headrest open-cell foam panel 72 sealed within a bladder 66 formed by covering material. The headrest panel 72 can have widthwise and lengthwise through-holes 40, 42 that facilitate air flowing more easily within the foam matrix. There will normally be at least one widthwise hole 40 and up to three lengthwise holes 42. The through-holes 40, 42 will normally have a spacing that ranges from 3 to 4 in. (7.62 to 10.16 cm). The cross-section dimension of the head rest 64 will normally range from 5 in.×8 in. to 7 in.×12 in. (12.7 cm×30.32 cm to 17.78 cm×30.48 cm). The head rest air bladder 66 fluidly communicates with the seat back bladder 32 through flexible air channels.

The embodiments of the present invention that are shown in FIGS. 1 through 14 can be mounted in many different types of seat support structures. These seat support structures can be mounted to the floor, sides, or ceiling of a vehicle cab. They will be configured and have geometries that will be compatible with the vehicle in which they are placed.

Figure 15:
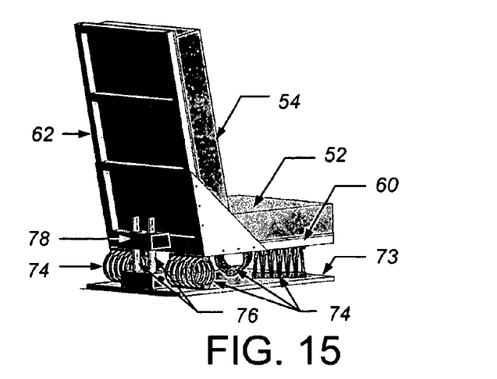
FIG. 15 is a perspective view of a seat shock and vibration isolation system including a seat mounted on wire rope springs.

The shock and vibration isolation effectiveness of the seat shock and vibration reducing bladder can be enhanced by mounting the embodiments of the present invention described above on a resilient (spring-like) structural support system as shown in FIG. 15. FIG. 15 shows the seat shock and vibration reducing bladder system mounted on a base plate 73 by a set of four resilient elements 74. The base plate 73 could be part of the vehicle cab floor or frame of the vehicle. Linear shafts 76 and associated bushings 78 are used to restrict the motion of the seat system to the vertical direction. The resilient elements 74 are preferably wire rope springs.

Figure 16:
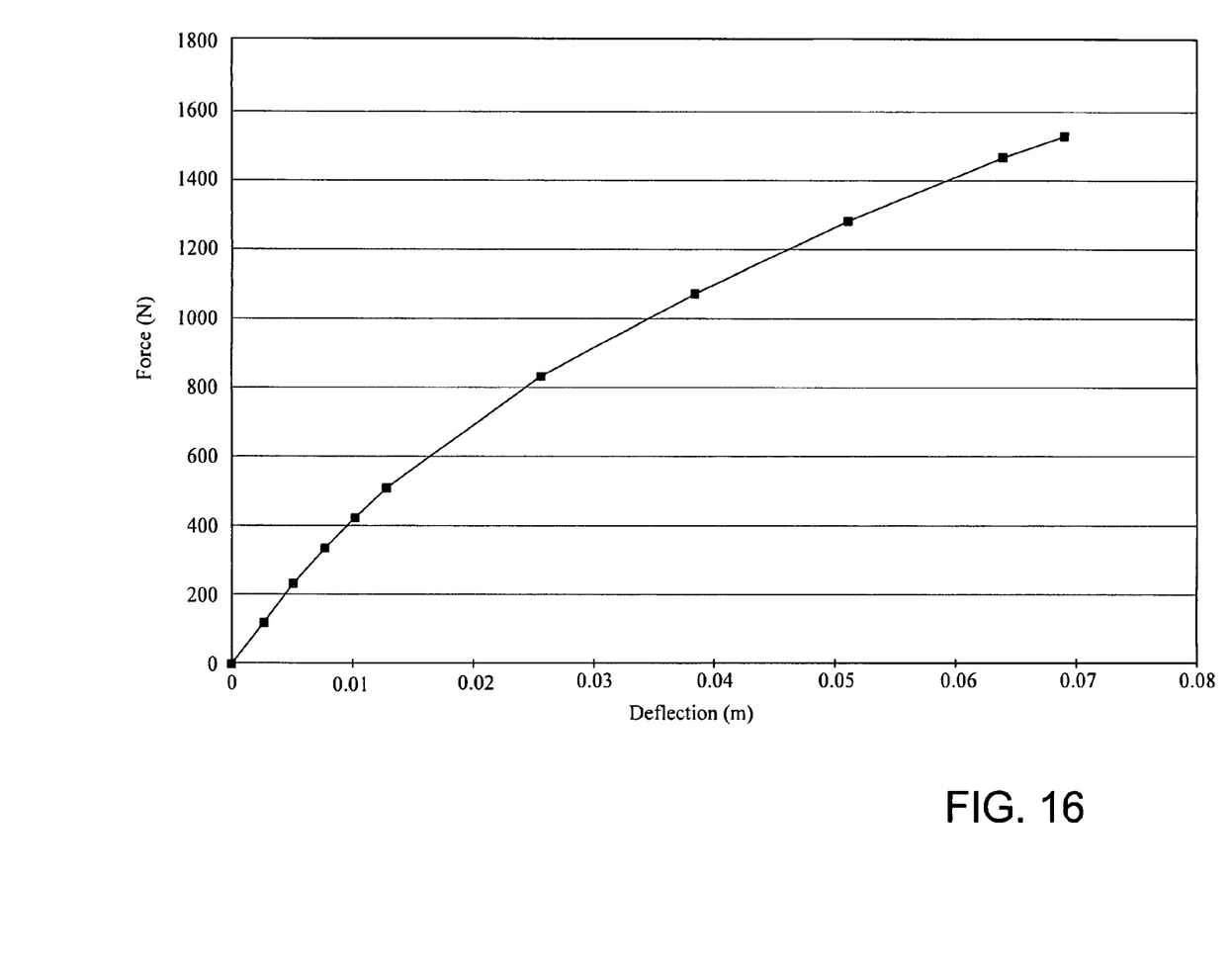
FIG. 16 is a graph of a typical load-deflection curve for the wire rope springs of FIG. 15.
Figure 17:
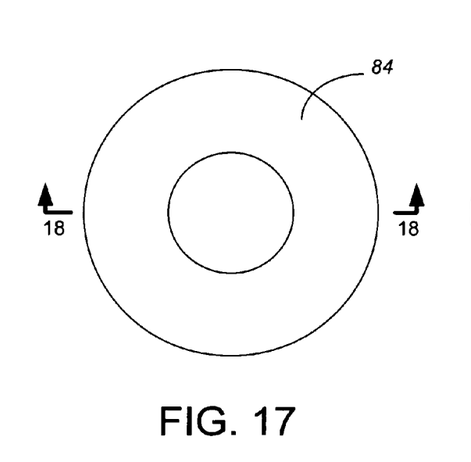
FIG. 17 is a plan view of a toroidal/elliptical air bladder spring geometry.
Figure 18:
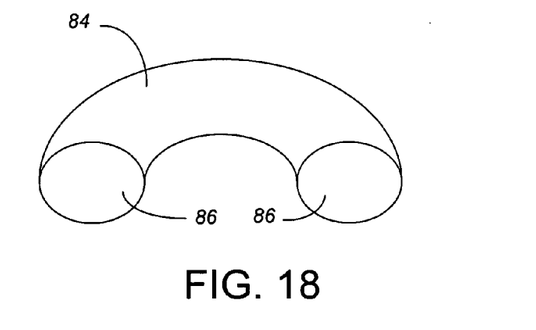
FIG. 18 is a cut-away perspective view of the toroidal/elliptical air bladder spring geometry of FIG. 17 taken along lines 18-18 in FIG. 17.
Figure 19:
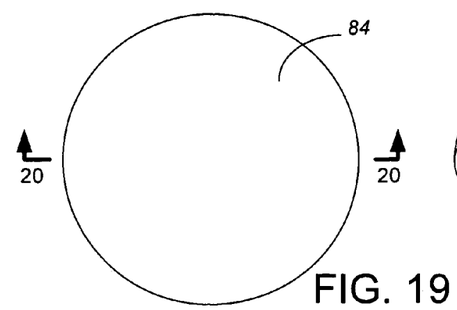
FIG. 19 is a plan view of a compressed circular air bladder spring geometry.
Figure 20:
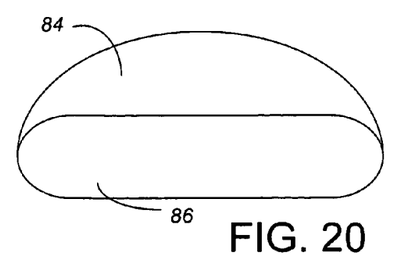
FIG. 20 is a cut-away perspective view of the compressed circular air bladder spring geometry of FIG. 19 taken along lines 20-20 in FIG. 19.
Figures 21, 22:
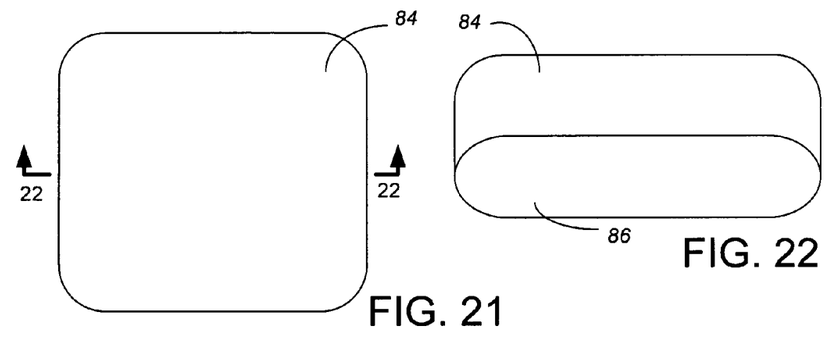
FIG. 21 is a plan view of a compressed square air bladder spring geometry.
FIG. 22 is a cut-away perspective view of the compressed square air bladder spring geometry of FIG. 21 taken along lines 21-21 in FIG. 21.

FIG. 16 shows a typical load-deflection curve for a wire rope spring. The resilient elements can alternatively be steel coil springs, leaf springs, air (pneumatic) springs, an air bladder spring, or combination thereof. The load-deflection curve of a resilient element is characterized by the type of resilient element used to support the seat. The load-deflection curve of spring elements can be a straight line indicating a linear spring rate characteristic. It can curve down as shown in FIG. 16 or it can curve up indicating a non-linear spring rate characteristic. The resilient element installation configuration and load-deflection characteristics are dependent on the anticipated seat, seat structural frame, and seat occupant weight and the type of vehicle structural system used to support the seat structural frame.

FIGS. 17 through 22 depict several exemplary air bladder spring geometries which can be used as an alternative type of resilient element, functionally replacing the four resilient elements 74 from the embodiment of FIG. 15. Each involves a bladder 84 defining an air cavity 86, with the air pressure in the air cavity supporting the seat 34 (shown in FIGS. 1, 2, 11 and 12). Depending on a vehicle's cab configuration, the air bladder spring supporting a seat structure 34 may have other geometries.

Figure 23:
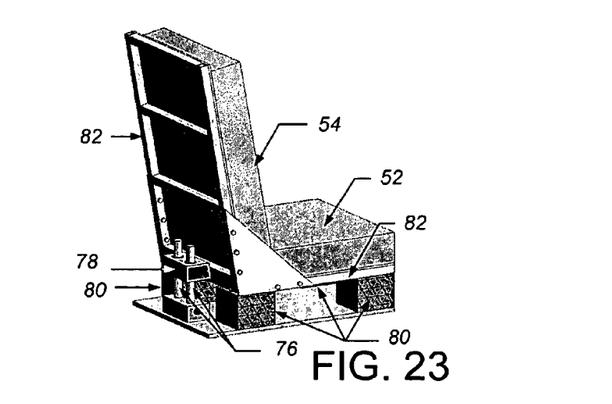
FIG. 23 is a perspective view of a seat shock and vibration isolation system mounted on load-limiter pads.

The shock and vibration isolation effectiveness of the seat shock and vibration reducing bladder can be enhanced by mounting the seat on a load-limiting device 80 that is used to support the seat structural frame 82 as shown in FIG. 23. Load limiting devices 80 are designed to collapse or be crushed over a specified vertical distance when a pre-designed load limit associated with the weight of the seat 34, seat structural frame 82, and seat occupant, along with a high shock input to the seat base, is exceeded. The preferred load limiters 80 are crushable aluminum honeycomb panels. The load limiters 80 are placed at the corners of the seat bottom structural frame 60. They can also be group together into a single panel and placed at or near the center of the seat bottom structural frame 60. Load limiters can alternatively be pre-formed metal or non-metal supports, a honeycomb panel (or panels) with a pre-determined thickness that is comprised of a pre-formed geometric honeycomb metal or non-metal matrix, or pre-designed metal tubes or solid rods that are designed to slide within tightly fitted outer tubes.

Figure 24:
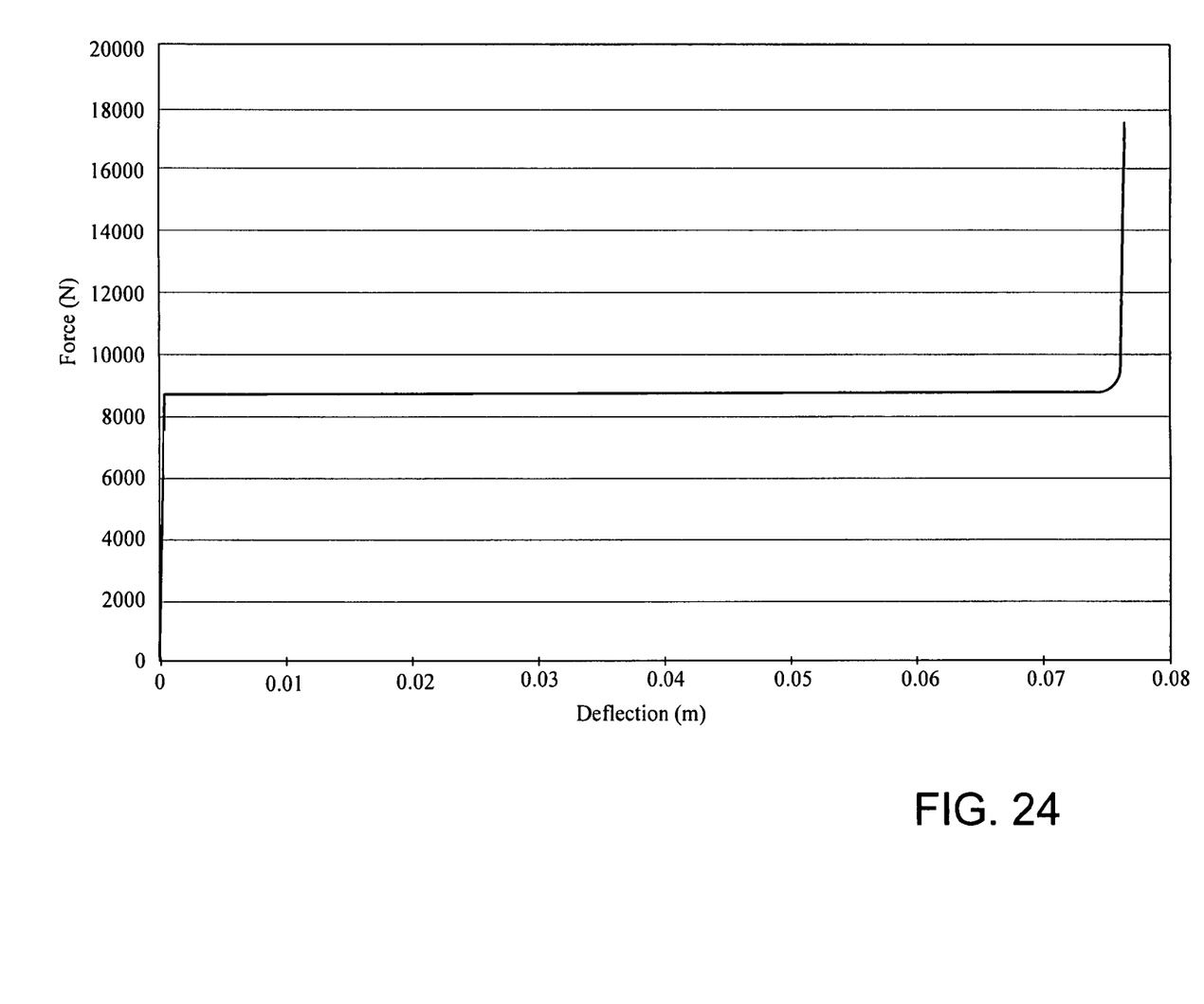
FIG. 24 is a graph showing a typical load-deflection curve for the set of load-limiter pads of FIG. 23.

FIG. 24 shows a typical load-deflection curve of a load-limiting device 80. Energy is dissipated as the load-limiter resistance force acts over the deflection distance of the load limiter 80. A load limiter installation configuration and load-deflection characteristics are also dependent on the anticipated seat 34, seat structural frame 82, and seat occupant weight and the type of vehicle structural system used to support the seat structural frame 82.

Although the present invention has been described with reference to preferred embodiments, workers skilled in the art will recognize that changes may be made in form and detail without departing from the spirit and scope of the invention.

The invention claimed is:

1. A seat system comprising:
   a seat bottom comprising:
      a seat bladder retaining compressible fluid; and
      a resilient compressible open cell panel disposed within the seat bladder, wherein the seat bottom open cell panel is formed of open cell foam, wherein the seat bladder is bonded to surfaces of the open cell foam of the seat bottom open cell panel, and wherein the seat bottom open cell panel comprises holes cut into the open cell foam, the holes each having a longitudinal axis directed within a plane defined by the seat bottom open cell panel;
   a seat back comprising:
      a back bladder retaining compressible fluid; and
      a resilient compressible open cell panel disposed within the back bladder; and
   a plurality of simultaneously active independent interconnections extending between the seat bottom and the seat back such that the seat bladder and the back bladder are in fluid communication through the simultaneously active interconnections, wherein the holes in the seat bottom open cell foam are for rapid movement of fluid within the seat bottom open cell foam when fluid moves through the interconnections between the seat bottom and the seat back.

2. The seat system of claim 1, further comprising a protective covering surrounding both the seat bottom and the seat back.

3. The seat system of claim 1, further comprising at least one valve in the interconnections for controlling the rate of fluid flow between the seat bladder and the back bladder.

4. The seat system of claim 1, wherein the interconnections are provided by tubes formed from a different material than the seat bladder and the back bladder.

5. The seat system of claim 1, wherein both the seat bladder and the back bladder are formed from a top sheet of a fluid impervious material joined to a bottom sheet of a fluid impervious material joined to the top sheet around a sealed perimeter.

6. The seat system of claim 1, wherein the seat bottom further comprises a rigid seat bottom under the seat bladder and wherein the seat back comprises a rigid back behind the back bladder.

7. The seat system of claim 6, wherein the rigid seat bottom is supported on a resilient support system.

8. The seat system of claim 6, wherein the rigid seat bottom is supported on a load limiting device.

9. The seat system of claim 1, wherein the seat back open cell panel is formed of open cell foam, and wherein the back bladder is bonded to surfaces of the open cell foam of the seat back open cell panel.

10. The seat system of claim 9, wherein the seat back open cell panel comprises holes cut in the open cell foam for rapid movement of fluid within the seat back open cell foam when fluid moves through the interconnections between the seat back and the seat bottom, the holes each having a longitudinal axis directed within a plane defined by the seat back open cell panel.

11. The seat system of claim 1, further comprising:
a head rest comprising:
a head rest bladder retaining compressible fluid; and
a resilient compressible open cell panel disposed within the head rest bladder.

12. The seat system of claim 11, further comprising:
a plurality of independent interconnections extending between the seat back and the headrest such that the back bladder and the head rest bladder are in fluid communication through the interconnections.

13. The seat system of claim 12, wherein the head rest open cell panel comprises holes cut into the open cell foam for rapid movement of fluid within the head rest open cell foam when fluid moves through the interconnections between the head rest and the seat back.

14. The seat system of claim 11, wherein the head rest open cell panel is formed of open cell foam, and wherein the head rest bladder is bonded to surfaces of the open cell foam of the head rest open cell panel.

15. A seat system comprising:
a seat bottom comprising a seat bladder retaining compressible fluid;
a seat back comprising a back bladder retaining compressible fluid;
a plurality of independent interconnections extending between the seat bottom and the seat back such that the seat bladder and the back bladder are in fluid communication through the interconnections;
at least one valve in the plurality of interconnections permitting controlled restriction of flow between the seat bladder and the back bladder during a compression event; and
a resilient compressible open cell foam panel disposed within the seat bladder, with holes cut in the open cell foam for rapid movement of fluid within the seat bottom open cell foam when fluid moves through the interconnections between the seat bottom and the seat back, the holes each having a longitudinal axis directed within a plane defined by the seat bottom open cell panel, and wherein the seat bladder is bonded to surfaces of the resilient compressible open cell foam panel.

16. The seat system of claim 15, wherein each of the interconnections permits two directional compressible fluid flow.

17. A seat system comprising:
a seat bottom comprising:
a seat bladder retaining compressible fluid; and
a rigid seat bottom under the seat bladder;
a seat back comprising:
a back bladder retaining compressible fluid; and
a rigid back behind the back bladder;
a plurality of independent simultaneously active interconnections extending between the seat bottom and the seat back such that the seat bladder and the back bladder are in fluid communication through the simultaneously active interconnections;
an air bladder under the rigid seat bottom providing resilient support for the seat bottom; and
resilient compressible open cell foam panels disposed within the seat bladder and the back bladder, with holes cut into the open cell foam panels for rapid movement of fluid within the open cell foam panels when fluid moves through the interconnections between the seat bottom and the seat back, the holes each having a longitudinal axis directed within a plane defined by the open cell foam panel, and wherein the seat bladder is bonded to surfaces of the resilient compressible open cell foam panel.

18. A seat system comprising:
a seat bottom comprising:
a seat bladder retaining compressible fluid; and
a resilient compressible open cell panel disposed within the seat bladder;
a seat back comprising:
a back bladder retaining compressible fluid; and
a resilient compressible open cell panel disposed within the back bladder, wherein the seat back open cell panel is formed of open cell foam, wherein the back bladder is bonded to surfaces of the open cell foam of the seat back open cell panel, and wherein the seat back open cell panel comprises holes cut in the open cell foam, the holes each having a longitudinal axis directed within a plane defined by the seat back open cell panel; and
a plurality of simultaneously active independent interconnections extending between the seat bottom and the seat back such that the seat bladder and the back bladder are in fluid communication through the simultaneously active interconnections, wherein the holes in the seat back open cell foam are for rapid movement of fluid within the seat back open cell foam when fluid moves through the interconnections between the seat back and the seat bottom.

19. The seat system of claim 18, further comprising at least one valve in the interconnections for controlling the rate of fluid flow between the seat bladder and the back bladder.

20. The seat system of claim 18, wherein both the seat bladder and the back bladder are formed from a top sheet of a fluid impervious material joined to a bottom sheet of a fluid impervious material joined to the top sheet around a sealed perimeter.

21. The seat system of claim 18, further comprising:
a head rest comprising:
   a head rest bladder retaining compressible fluid; and
   a resilient compressible open cell panel disposed within the head rest bladder; and
a plurality of independent interconnections extending between the seat back and the headrest such that the back bladder and the head rest bladder are in fluid communication through the interconnections.

* * * * *